United States Patent

Yoshino et al.

Patent Number: 5,362,329
Date of Patent: Nov. 8, 1994

[54] PROCESS FOR PRODUCING HEAT-MOISTURE TREATED STARCH

[75] Inventors: Zenichi Yoshino, Kashihara; Toshiaki Komaki, Nishinomiya; Yoshiki Kurahashi, Osaka, all of Japan

[73] Assignee: Sanwa Kosan Kabushiki Kaisha, Kashihara, Japan

[21] Appl. No.: 961,981

[22] Filed: Oct. 16, 1992

[51] Int. Cl.$^5$ .......................... C08B 30/00; A23L 1/05
[52] U.S. Cl. .......................... 127/65; 127/71; 426/476; 426/661
[58] Field of Search .................. 127/65, 71; 426/476, 426/661

[56] References Cited

U.S. PATENT DOCUMENTS

| | | | |
|---|---|---|---|
| 3,220,884 | 11/1965 | Huber et al. | 127/71 |
| 3,630,775 | 12/1971 | Winkler | 127/71 |
| 3,876,467 | 4/1975 | McCombs et al. | 127/71 |
| 4,013,799 | 3/1977 | Smalligan et al. | 426/578 |
| 4,418,090 | 11/1983 | Bohrmann et al. | 127/71 |
| 4,491,483 | 1/1985 | Dudacek et al. | 127/71 |

FOREIGN PATENT DOCUMENTS 0281078  8/1990  Germany ................ 426/661

OTHER PUBLICATIONS

Heat-Moisture Treatment of Starch, L. Sair, pp. 8-26 Apr. 1966.
Heat-Moisture Treatment of Starches, K. Kulp and K. Lorenz, pp. 46-48 (1981).
Cereal-and Root Starch Modification by Heat-Moisture Treatment, K. Lorenz and K. Kulp, pp. 50-54 (1982).

*Primary Examiner*—Paul Lieberman
*Assistant Examiner*—P. L. Hailey
*Attorney, Agent, or Firm*—Armstrong, Westerman, Hattori, McLeland & Naughton

[57] ABSTRACT

A process for producing heat-moisture treated starch by treating starch in a pressure vessel resistant to both internal and external pressure and equipped with a vacuum line and pressure-steam line. The process comprises treating the starch in the pressure vessel under reduced pressure of 200 Torr or less in a first step, and then introducing steam into the pressure vessel in a second step, thereby performing heat treatment on the starch. The treating of the starch under reduced pressure tends to remove entrained air in spaces between particles of starch.

3 Claims, 1 Drawing Sheet

PROCESS FOR PRODUCING HEAT-MOISTURE TREATED STARCH

BACKGROUND OF THE INVENTION

This invention relates to an improvement in the process for modifying the characteristics of starch by subjecting it to heat-moisture treatment, more particularly, to an industrial process for efficiently producing heat-moisture treated starch.

It was reported in detail by V. L. SAIR in "*Cereal Chemistry*, 44, January, on pages 8 to 26 (1967)" that when potato starch or corn starch is heated at 95° to 100° C. at a relative humidity of 100% the physical characteristics will be modified without change in its granular appearance. In this report, the starch spread as a thin layer about 2 cm thick was put in a pressure vessel of 100% relative humidity and heated at 95° to 100° C. for about 16 hours. It was also attempted that starch adjusted to a moisture content of 18 to 27% is heated in a hot air oven.

As the modifications in physical characteristics of starch caused by heat-moisture treatment, there are known change in equilibrium moisture content, change in X-ray diffraction pattern, change in the swelling power of starch granules, and increase in the gelatinization temperature.

The degree of these changes varies continuously depending upon the temperature and time of heat-moisture treatment as well as the moisture content. In general, potato starch with a high moisture content changes under milder heat-moisture treatment conditions compared with corn starch. A higher degree of changes tends to occur when the moisture content is increased by addition of water.

Particularly, corn starch, which is a material most applicable industrially, has an equilibrium moisture content of about 13% and exhibits a high gelatinization temperature, and hence it has to be treated at a high temperature for a long time (for example, at a temperature of 120° C. or higher for two hours), or it has to be moistened to a moisture content of 20 to 25% prior to heat treatment, in order to effect modification in its physical characteristics by heat-moisture treatment.

In addition, unless a thin starch layer less than 3 cm in thickness is used for heating, modification of same degree is not effected throughout the outer and interior portions. Heat-moisture treatment of starch with a high moisture content obtained by addition of water also causes agglomeration of its granules, thus making it difficult to pulverize the treated products; and heating with steam of 100% relative humidity results in the condensation of steam on the surface of the starch layer, thus agglomerating the gelatinized starch granules, and this also makes it difficult to pulverize the treated products. Consequently, no practical process for industrial production of heat-moisture treated starch has been established and no commercialized product has yet been placed on the market, although preparation of heat-moisture treated starch is not so difficult when carried out in a small amount on a laboratory scale.

This invention relates to a method of processing starch by utilizing the fact that heat-moisture treatment of a material containing starch, such as commercially available corn starch, causes modification of its physical properties, and provides a process for producing heat-moisture treated starch, which is characterized in that the degree of modification can be properly controlled, the treated starch can be easily pulverized without the need for any special operation, and treatment of a large amount can be performed in a short time.

BRIEF DESCRIPTION OF THE DRAWINGS

This invention will be further described by referring partly to the accompanying drawings wherein.

DESCRIPTION OF THE PREFERRED EMBODIMENTS

Autoclaves are generally used as a pressure vessel for heat-moisture treatment, but are not suitable for mass production because of the disadvantages described above. Under the circumstances, the present inventors designed various apparatuses and examined their performances, and it has been found that there should be used an apparatus capable of working under elevated and reduced pressures in order to perform the process of this invention. When using an apparatus capable of agitation under elevated and reduced pressures, in particular, it is possible to put starch directly into said apparatus and to subject it to heat-moisture treatment with stirring, thereby enabling the treatment of a large amount of starch at a time more uniformly. As examples of such an apparatus, may be mentioned a Hosokawa-Nauta vacuum mixer of reactor type widely employed as a convecting mixer, and a rotating cylindrical steam-pressure vessel (NK-type) employed, in the manufacture of soybean sauce, for sterilizing soybeans which are the raw material for Koji. In this method, it is essential to prevent the increase in the amount of water caused by condensation of steam; unless the formation of condensed water, which takes place when the introduced steam comes into contact with the apparatus and starch, is prevented, the starch absorbs an excessive amount of water to gelatinize, making blocks and aggregates, thus causing pulverization difficult. Therefore, prior to the use, it is necessary to preheat the whole apparatus. This method is hereinafter referred to as a convective mixing heat-moisture treatment (abbreviated as M-HMT method).

In contrast, a method in which starch spread in a tray as a thin layer is subjected to heat-moisture treatment in an autoclave without stirring is hereinafter referred to as a stationary heat-moisture treatment (S-HMT method). The present inventors have found that a closed vessel resistant to both internal and external pressures (e.g. Retort Sterilizer; a product of Hisaka Works, Ltd.), with a vacuum line and a pressure-steam line attached thereto, can preferably be used as a heat-moisture treatment apparatus for the S-HMT method. It is preferable to preheat the whole apparatus and the tray for the starch to be treated prior to the use. The starch to be treated is spread on the preheated tray in the form of a thin layer. The thickness of the starch layer is important and is preferably about 5–10 cm. The tray with the starch layer thereon was placed in the apparatus and then the treatment of the starch was conducted under various conditions by successively opening and closing the vacuum and pressure-steam lines.

Starch was spread in a stainless tray therein as a thin layer, and its heat-moisture treatment was carried out under various conditions by successively opening and closing the vacuum and pressure-steam lines.

Figure 1:
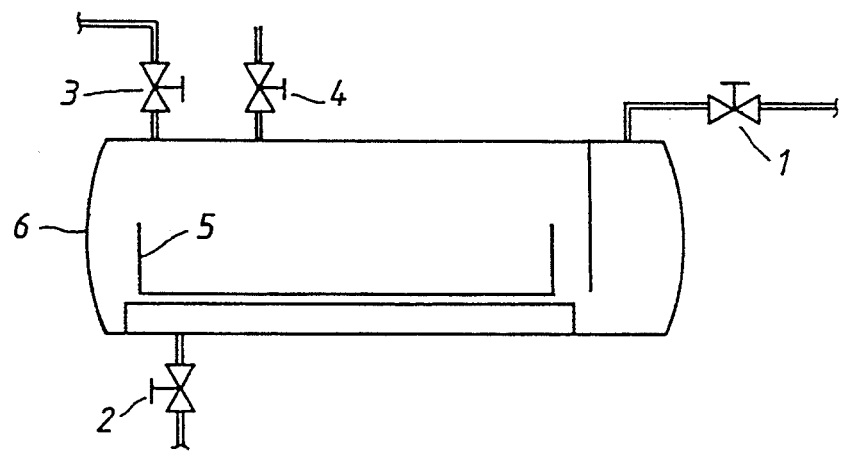
FIG. 1 is a schematic view of an apparatus which may be used for the stationary heat-moisture treatment according to this invention.

FIG. 1 shows a schematic view of the S-HMT apparatus, wherein numeral 1 designates a pressure-steam line, numeral 2 designates a drain valve, numeral 3 designates a vacuum line, numeral 4 designates a purge valve, numeral 5 designates a tray, and numeral 6 designates a cover which may be opened to insert or take out the tray 5, on which the starch to be treated is spread in a thin layer.

As the standard and conventional heat-moisture treatment by the S-HMT method, steam was introduced through the pressure-steam line 1 and then the valve 4 was opened to sufficiently evacuate the vessel in the apparatus, and starch was heat-treated under pressure at a relative humidity of 100%.

Apart from the above conventional method, a method of the present invention was carried out by combining the first step of pressure reduction by opening the valve 3 and the subsequent second step of heating under pressure by introducing steam under pressure the valve 1, and also by repeating such combination of pressure reduction and heating under pressure, while varying the degree of vacuum.

The modifications in physical characteristics of the heat-moisture treated starch processed as described above were examined in terms of the following points:

(1) Changes of viscosity by Brabender-Amylograph
(2) Changes of endotherm characteristics by a differential scanning calorimeter
(3) $\alpha$-Amylase digestibility at 40° C.
(4) Increase in $\alpha$-Amylase absorbability
(5) Increase of stained granules, and observation of the same under a microscope
(6) Preparing starch paste, and measuring its viscosity stability These physical properties were measured by the following methods:

(1) Measurement of viscosity characteristics by Brabender-Amylograph was performed as described below. Corn starch samples of 31.5 g and 45 g (as dry substance) for 7% and 10% aqueous suspensions respectively to be used for amylography, and a potato starch sample of 22.5 g (as dry substance) for 5% aqueous suspension for amylography, were weighed, water was added to each of these samples to a total weight of 450 g, and each mixture was subjected to amylography. The mixture was heated at a rate of 1.5° C./min for 30 minutes from 50° C. to 95° C., maintained at this temperature for 30 minutes and then cooled for 30 minutes at a rate of 1.5° C./min, with the viscosity being continuously read throughout the whole period of time, thereby measuring the temperature at which the viscosity line departs from the base line (the gelatinization temperature), the temperature at maximum viscosity, the maximum viscosity, the viscosity after heating at 95° C. for 30 minutes, and the viscosity upon cooling to 50° C.

(2) Measurement of the changes in endotherm characteristics by a differential scanning calorimeter was performed by mixing starch with water in an amount 2.5 times as much as that of dry starch, and then heating the mixture to 140° C. at a scanning rate of 2° C./min or heating the mixture to 100° C. at a scanning rate of 5° C./min. The results of measurement were expressed by the endotherm temperature at peak onset, the endotherm temperature at peak, the endotherm temperature at peak conclusion, and the heat of gelatinization per gram of dry starch (joule/g). An apparatus made by Seiko Instruments Inc. was used for this measurement.

(3) $\alpha$-Amylase digestibility at 40° C. was measured as described below. To heat-moisture treated starch (0.1 g as dry substance) put in a 10 ml centrifuge tube, was added 5 ml of thermostable $\alpha$-Amylase (Speedase HK made by Nagase Biochemicals, Ltd; 1 ml is equivalent to 18 dextrinogenic activity) diluted 1:1000 with 0.1N acetic acid-sodium acetate buffer solution (pH 6), with 1 mM calcium acetate and 5 mM sodium chloride added thereto, and the mixture was held at 40° C. for ten minutes with occasional shaking. After addition of 5 ml 1N-$H_2SO_4$ to inactivate the enzyme, the reaction mixture was centrifuged, and the total amount of sugar contained in the supernatant was analyzed by the phenol-sulfuric acid method, thus calculating the solubilized fraction.

(4) $\alpha$-Amylase absorbability was measured as described below. To 50 ml of Speedase LH ($\alpha$-Amylase preparations made by Nagase Biochemicals, Ltd.; 12000 DUN/g) was added 50 ml of water, the mixture was cooled in ice water, 240 ml of ethanol cooled in ice water was slowly added thereto, and the precipitate which separated out was collected by centrifugation at 5° C. (3000 rpm, 3 minutes) by using a cold centrifugal separator and dissolved in water together with 30 ml of ethanol to a total volume of 100 ml. This solution (5 ml) was put in a centrifuge tube, a starch sample (200 mg as dry substance) was added thereto, the mixture was stirred for about 90 minutes by the use of a magnetic stirrer and then centrifuged, and the $\alpha$-Amylase activity of the supernatant was measured. To the precipitated starch was added 5 ml of 0.1N acetic acid-sodium acetate buffer solution (pH 6.0) containing 1 mM calcium acetate and 5 mM sodium chloride, the mixture was heated at 60° C. for ten minutes to elute $\alpha$-Amylase from the precipitate, and its activity was measured, thereby calculating the amount of $\alpha$-Amylase absorbed in 1 g of the starch sample.

(5) The staining test of starch granules was carried out as described below. A small amount of starch sample was put in a 15 ml centrifuge tube, about 0.5 ml of 1% safranine-T (a basic dye) solution was admixed thereto, and the mixture was allowed to stand for about five minutes and subjected to centrifugation. To the precipitate thus obtained, was further added water to wash off the excess dye and remove it by centrifugation, this operation was repeated three times, the starch stained red by safranine-T was collected on a slide glass, a drop of 1% solution of direct sky blue-5B (a direct dye) was admixed thereto, and the mixture was observed under a microscope, thereby reading out the content of damaged starch granules stained blue. The changes in the shape of starch granules were also observed.

(6) The stability of starch paste viscosity was examined as described below. A 7.0% solution of starch sample was heated to 95° C. and then cooled to 40° C., and its viscosity was measured by the use of a Brookfield viscometer. The solution was then heated at 120° C. for 20 minutes under pressure in an autoclave and then cooled to 40° C., and its viscosity was measured. This operation was repeated, and the changes in viscosity were observed.

A variety of starch was treated at 129° C. for 120 minutes under standard conditions for conventional heat-moisture treatment by the use of a pressure sterilizer of laboratory scale, thereby forming a starch layer 1.5 cm thick and subjecting it to heat-moisture treatment under pressure, and the amylograph of the starch thus treated was examined at a concentration of 7%.

The results are shown in Table 1.

TABLE 1

Amylograms of Heat-Moisture Treated Starches
(Heat-moisture treatment conditions: 129° C. × 120 minutes;
Starch layer thickness: 1.5 cm)

| Kind of starch | Control corn starch | Corn starch | Water-adjusted corn starch | Sweet potato starch | Potato starch |
|---|---|---|---|---|---|
| Moisture content, % (before treatment) | | 14.0 | 21.0 | 16.4 | 18.4 |
| Moisture content, % (after treatment) | | 13.3 | 18.0 | 13.3 | 15.0 |
| Gelatinization temperature, °C. | 81.5 | 81.5 | — | 83 | — |
| Temperature at maximum viscosity, °C. | 91.7 | 95 | 95 | 95 | — |
| Maximum viscosity, BU | 395 | 140 | 20 | 100 | — |
| Vscosity after heating at 95° C. for 30 minutes, BU | 260 | 120 | 40 | 210 | 5 |
| Viscosity after cooling to 50° C., BU | 680 | 200 | 60 | 280 | 20 |

As apparent from the results shown above, the potato starch and corn starch whose water content has been adjusted were modified under such heat-moisture treating conditions so as to show scarcely any 7%-amylogram viscosity, while the corn starch with no water added thereto was modified in a lower degree. In addition, the corn starch added with water were wholly agglomerated, and hence its pulverization after the treatment was difficult. Thus, when commercially available corn starch was subjected to heat-moisture treatment without any water content adjustment, not so much change in the amylogram viscosity was observed even under the heating conditions of 129° C. (1.7 Kg/cm²G), 120 minutes and 1.5 cm layer thickness.

In contrast, the process of this invention gives starches with modified physical characteristics satisfactorily applicable to industrial purposes, as shown in the Examples described later. Thus, in the case of S-HMT using the vacuum/pressure-steam heat treatment operation, the change in viscosity was observed at a temperature of about 105° C. and higher even when the starch layer thickness is 5 cm, thus enhancing the α-Amylase digestibility at 40° C. and increasing the content of stained granules; and when heated at 124° C., the heat-moisture treatment for five minutes markedly changed the viscosity, and treatment for ten or longer minutes showed scarcely any 7%-amylogram viscosity and markedly enhanced the α-Amylase absorbability as compared with the untreated corn starch; and when treated for 20 minutes, the absorbability was about ten times as high as that of the untreated corn starch and the residual amylase activity in the supernatant (obtained by adding 4% of the treated starch to α-Amylase solution, stirring the mixture at 5° C. for 90 minutes and subjecting it to centrifugation) was about 10% compared with the untreated solution. Thus there was obtained modified starch which can be industrially useful for the adsorption and purification of α-Amylase. Analysis by the use of a differential scanning calorimeter showed that endotherm characteristics were observed even with the sample treated at 124° C., but the higher the heat-moisture treatment temperature, the higher the endotherm temperature at peak onset, the endotherm temperature at peak and the endotherm temperature at peak conclusion, and the lower the heat of gelatinization (½, as compared with the untreated sample, when treated at 124° C. for 20 minutes). These facts indicate that, although swelling of granules takes place, the degree of swelling is too low to be measured as viscosity. When 5 to 7% starch paste made from the treated starch was heated under pressure in an autoclave, the decrease in viscosity was lower as compared with the untreated corn starch which showed a remarkable decrease in viscosity. When starch paste heated under pressure is subjected to freeze-thaw treatment, the starch granules are converted into water-insoluble spongy granules, which can be dehydrated by compression, and practically no starch is contained in the water removed. This indicates that this heat-moisture treated starch has been modified in such a manner that it is hardly degradated and eluted. Observation of the heat-moisture treated starch under a scanning electron microscope clearly shows the formation of hollows on its surface.

It is observed that action of α-Amylase starts digestion at these concaved portions. The staining test indicates that the content of stained starch granules increases with the higher heat-moisture treatment temperature and the longer treatment time, and most of the granules are stained blue when treated at 124° C.

As described above, if heat-moisture treatment by the vacuum/pressure-steam heating method is adopted, even corn starch (a starch which is relatively difficult to be modified by the heat-moisture treatment) can be modified into a starch whose aqueous suspension shows substantially no viscosity upon the heat-moisture treatment at 124° C. for a relatively short time, even without any special operationsuch as addition of water. The modified starch thus obtained is suitable for preparing the so-called "retort" foods, because its paste shows little change in viscosity after heating under pressure in an autoclave is repeated.

This invention has been accomplished by a series of studies including the experiments described above and the following investigations for industrial application.

Briefly, this invention relates to a process for heat-moisture treating various kinds of starch and cereal flour using a closed apparatus resistant to both internal and external pressures and equipped with a vacuum line and a pressure-steam line, which comprises at least two steps: treatment under reduced pressure, and heat-moisture treatment.

Described below are the points to which special attention should be paid in practicing the process (S-HMT and M-HMT methods) of this invention. It is preferable that the apparatus be preheated prior to the first step, in order to avoid the problem, which otherwise occurs, that introduction of steam forms a large amount of condensed water because of the temperature difference from the parts of vessel, thus increasing the moisture content of starch excessively or partially and causing partial gelatinization. The apparatus should preferably be jacketed in the parts where possible and be equipped with a heater for warmth keeping or surface heating in the other parts. In case of M-HMT, the apparatus remains hot when the operation is continued, and hence there is no need for preheating every time before starch is charged therein.

In the case of S-HMT, the tray should preferably be heated preliminarily.

In the first step, starch is charged or put in the apparatus, followed by pressure reduction. The object of this operation is to remove the air in the apparatus and in the starch as far as possible. There is no specific limitation as to the degree of vacuum, but it is generally 200 to 50 Torr. The time required for this operation may vary according to the type of apparatus, but is generally several minutes or shorter. In case of M-HMT starch is also preheated in the preliminary heating and stirring operation, and this causes evaporation of water contained in the starch by the pressure reduction, reducing the moisture content by several percent. This is not very serious problem, but an extremely high degree of drying may result in a deficient moisture content in the heat-moisture treatment. Therefore it is disadvantageous to keep the reduced pressure for a long time after the predetermined vacuum has attained and also in terms of operation efficiency. It is preferable therefore to terminate the vacuum operation when the pressure is reduced to about 100 Torr and to immediately start the steam introduction operation. In this case the steam introduction may be conducted until the predetermined high steam pressure immediately and directly from the state of the reduced pressure. Alternately the steam may be first introduced to reach atmospheric (normal) pressure, then to conduct pressure reduction for more complete evacuation and then to introduce steam up to the predetermined high pressure. The latter operation is preferable particularly in case of S-HMT and in case of larger starch layer thickness.

In the second step, steam is introduced and heat-moisture operation is performed. The amount of steam to be introduced varies according to the temperature and time of the heat-moisture treatment.

The proper temperature and time of the heat-moisture treatment are determined depending on the desired properties of the treated starch, and are generally 100° to 145° C. for 5 to 120 minutes. For example, treatment at a temperature of 120° C. or higher for 5 to 60 minutes is required to obtain starch showing practically no amylogram viscosity at 7% concentration. The steam introduced generally saturates the apparatus with moisture at the temperature, thus increasing the moisture content of starch. The moisture content of starch generally increases by about 9 to 17% based on the weight of solid starch during the heat-moisture treatment, and this amount is determined by the amount of steam introduced. The effect of heat-moisture treatment is thus determined not only by the treating temperature and time but also by the amount of steam introduced.

Cooling the apparatus in some degree before taking out the high-temperature treated starch is convenient for the subsequent operations; and in addition, lowering the moisture content, increased by the heat-moisture treatment, down to a level close to the equilibrium moisture content (10±3%) is a preferable operation step. The treated starch thus obtained not only has the modified properties as described above, but also exhibits the sterilizing and deodorizing effects, thus enhancing its value as a food material.

Figure 2:
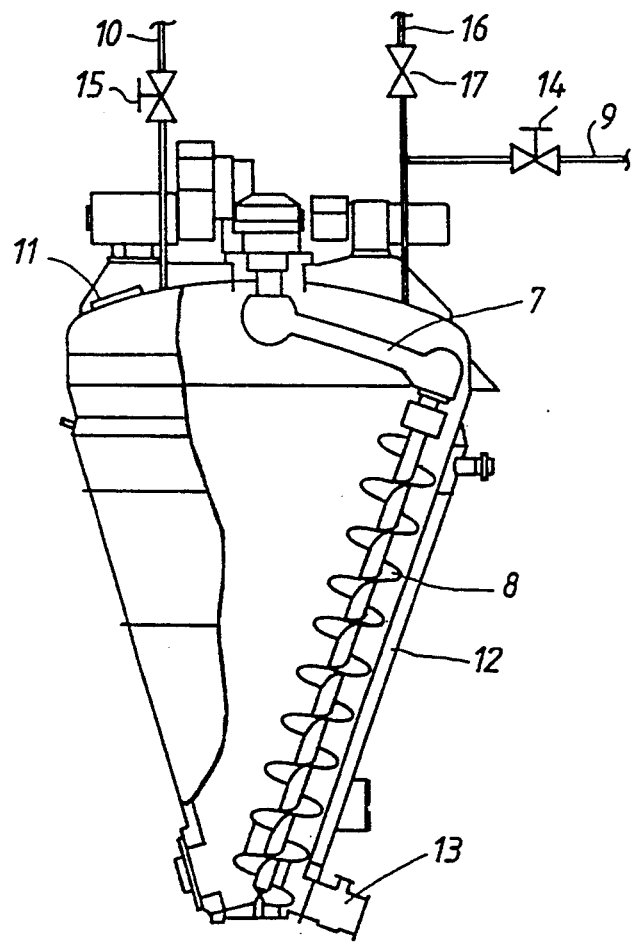
FIG. 2 is a schematic view of an apparatus which may be used for the convective mixing heat-moisture treatment according to this invention.

The apparatus to be used in M-HMT method should preferably comprise a conical vessel equipped with a screw agitator (having an orbiting arm and a rotating screw element) therein, such as Hosokawa-Nauta vacuum mixer (manufactured by Hosokawa Micron Corporation, Osaka, Japan), as shown in FIG. 2. By the use of this apparatus the first and second steps can be operated repeatedly as required.

FIG. 2 is a schematic view of an apparatus suitable for carrying out the M-HMT, in which numeral 7 denotes an orbiting arm, numeral 8 denotes a rotating screw, numeral 9 denotes a pressure-steam pipe line, numeral 10 denotes a vacuum pipe line, numeral 11 denotes a charge opening, numeral 12 denotes a steam jacket, numeral 13 denotes a discharge opening (normally closed), and numeral 14 is a valve provided in the steam pipe 9.

In carrying out the process of this invention by the use of such apparatus as shown in FIG. 2, steam is first introduced through the pressurized steam pipe 9 by opening the valve 14 to preheat the whole apparatus, for example to be about 80° C. Then the valve 14 is closed. Then the cover 11 is opened to charge the material starch into the apparatus through the opening and then closed. Immediately thereafter the screw 8 is rotated and then the orbiting arm 7 is operated. The orbiting rate and screw rotation rate are preferably about 3.65 rpm and about 93 rpm respectively. Thus the starch temperature is increased. While continuing the rotation the 1st step (vacuum treatment) is conducted. Thus the valve 15 for the vacuum pipe 10 is opened. When the internal pressure has come to be about 200–50 Torr, the valve 15 is closed and the valve 14 is opened to introduce the pressure steam into the apparatus. When the internal temperature has attained the predetermined value the same internal temperature is maintained for a predetermined period of time. This moisture-heat treatment is the 2nd step of the present invention.

After the 2nd step, the valve 14 is closed to terminate the pressure steam introduction, the valve 17 is opened to restore the normal or atmospheric pressure within the apparatus. Indicated with the numeral 16 is a vent pipe. Then the valve 17 is closed and the valve 15 is opened to reduce the interior pressure so that the inside temperature of the apparatus is lowered and at the same time any excess moisture is evaporated away. When the inside temperature has come down to about 80° C. or lower the valve 15 is closed and the discharge opening 13 is opened to discharge the moisture-heat treated starch therethrough.

If desired the 1st and 2nd steps may be repeated.

In case of a pressure-resistant apparatus having no stirrer, such as shown in FIG. 1, starch is spread in a tray as a thin layer, and the thickness of the starch layer is a condition of importance. Usually a thickness in the range from about 5 to 10 cm is suitable. When the layer is further thicker, heat-moisture treatment may be performed by repeating the pressure-reduction (1st step) and steam-introduction (2nd step) operations a plurality of times.

According to the process of this invention, starch with properties improved by the heat-moisture treatment can be efficiently produced on an industrial scale. Particularly, the starch produced by the process of this invention has the following advantages; its aqueous suspension shows practically no viscosity when heated, repeated pressure operations causes no viscosity decrease unlike ordinary starch, and it has favorable properties, such as markedly improved amylase absorbability.

There is no specific limitation upon the kind of starch to be treated by the process of this invention, but it is preferable to apply the process of this invention to corn starch which is mass-produced and readily available at a low cost as an industrial material, but which is said to be difficult to be modified by heat-moisture treatment when compared with potato starch. Commercially available corn starch, which generally contains about 13% moisture, may be subjected to the industrial operation in accordance with the present invention because it can be treated as such with the equilibrium water content condition, does not agglomerate after heat-moisture treatment, and can be pulverized very easily. Needless to say, other kinds of starch may also be treated by the process of this invention when desired. In addition, it is also possible to improve the physical characteristics of any cereal flour containing starch, such as wheat flour, corn meal and rice flour, by heat-moisture treatment according to the process of this invention, and the quality of these materials for the production of sterilizing and deodorizing foods can thus be enhanced.

EXAMPLES

The following Examples will further illustrate the invention.

EXAMPLE 1 S-HMT

Corn starch was spread as a 5 cm thick layer and subjected to heat-moisture treatment.

The apparatus used was of a type as shown in FIG. 1 having a cylindrical vessel 40 cm in diameter and 80 cm in length, resistant to both internal and external pressures (Retort Sterilizer; manufactured by Hisaka Works, Ltd.). Corn starch (about 3.0 Kg)was put on a stainless steel vat (25 cm×32 cm in size) so that a layer 5 cm thick will be formed. The vat with the starch layer was placed within the vessel. After closing the apparatus, the vacuum line was opened, and when the pressure was reduced to 30 Torr after ten minutes, it was closed and the pressure-steam line (steam pressure 2.4 Kg/cm$^2$G) was opened, thus introducing pressure steam into the vessel. After seven minutes, the internal temperature reached 100° C. and the pressure returned to the normal level. At this point of time, the pressure-steam line was closed and the vacuum line was again opened, and when the pressure was reduced to 30 Torr after nine minutes, the vacuum line was closed and the steam-pressure line was again opened. After heating at a predetermined temperature for a predetermined time, the applied pressure was removed, the vessel interior was then made reduced pressure and cooled. Then the treated starch was taken out and pulverized. Table 2 shows the results obtained by carrying out the above operations at different temperatures. Treatment at 124° C. produced modified starch showing no 7%-amylogram viscosity and having markedly enhanced α-Amylase absorbability.

TABLE 2

Effect of Temperature in Heat-Moisture Treatment by S-HMT
Corn starch
Heating time: 20 minutes; Starch layer thickness: 5.0 cm

| Heating temperature, °C. | Untreated | 105 | 110 | 115 | 124 |
|---|---|---|---|---|---|
| Gelatinization temperature °C. *1 | 81.5 | 83.7 | 81.5 | 86.5 | 86.5 |
| Temperature at maximum viscosity, °C. *1 | 92.0 | 95.0 | 92.0 | 95.0 | 95.0 |
| Maximum viscosity, BU *1 | 400 | 320 | 325 | 250 | 20 |
| Viscosity after heating at 90° C. for 30 minutes, BU *1 | 265 | 295 | 280 | 260 | 20 |
| Viscosity after cooling to 50° C., BU *1 | 660 | 610 | 550 | 470 | 40 |
| α-Amylase digestibility at 40° C., % | 0 | 21.0 | 31.0 | 27.0 | 60.7 |
| α-Amylase absorbability, DUN/g.st. | 14350 | 17900 | 23250 | 22100 | 136275 |
| Stained starch granules, % | 0 | 10 | 40 | 40 | 90 |
| Viscosity stability test | | | | | |
| 95° C. starch paste* | 100 | 100 | 100 | 100 | 100 |
| *After heating at 120° C. for 20 minutes | 87 | 59 | 50 | 104 | 132 |
| *After heating again at 120° C. for 20 minutes | 83 | 81 | 52 | 103 | 152 |

*1 Amylogram
*Viscosity compared with the starch paste viscosity at 95° C. being defined as 100.

EXAMPLE 2 S-HMT

Heat-moisture treatment was carried out at 124° C. with different treating times and starch layer thicknesses in a manner similar to Example 1. The results are shown in Table 3. Treatment at 124° C. for five minutes caused a higher degree of modification compared with treatment at 115° C. for 20 minutes, and treatment at 124° C. for ten minutes produced starch showing substantially no viscosity increase upon heating. A sufficient degree of modification was also observed even with the starch layer 21 cm thick. Table 4 shows the result obtained by measuring the starches heat-moisture treated at 124° C. by the use of a differential scanning calorimeter (heated to 140° C. at a scanning rate of 2° C./minute).

TABLE 3

Effect of heating time and layer thickness in Heat-Moisture Treatment by S-HMT
Corn starch; Heating temperature: 124° C.

| Layer Thickness | 5.0 cm | 5.0 cm | 5.0 cm | 21.0 cm |
|---|---|---|---|---|
| Heating Time | 5 min. | 10 min. | 20 min. | 20 min. |
| Gelatinization temperature °C. *1 | 86.7 | 89.0 | — | — |
| Temperature at maximum viscosity, °C. *1 | 95.0 | 95.0 | 95.0 | 95.0 |
| Maximum viscosity, BU *1 | 140 | 20 | 2 | 10 |
| Viscosity after heating at 95° C. for 30 minutes, BU *1 | 180 | 50 | 20 | 30 |
| Viscosity after coolong to 50° C., BU *1 | 290 | 90 | 40 | 50 |
| α-Amylase digestibility at 40° C., % | 54 | 60.7 | 67 | 25 |
| α-Amylase absorbability, DUN/g.st. | 97525 | 118125 | 136275 | 30175 |
| Stained starch granules, % | 75 | 90 | 90 | 50 |
| Viscosity stability test | | | | |
| 95° C. starch paste* | 100 | | | 100 |
| *After heating at 120° C. for 20 minutes | 111 | | | 132 |
| *After heating again at 120° C. for 20 minutes | 106 | | | 152 |

*1 Amylogram
*Viscosity compared with the starch paste viscosity at 95° C. being defined as 100.

TABLE 4

Endothermic Characteristics Measured by a Differential Scanning Calorimeter

| | Untreated material | Treated at 124° C. | | |
|---|---|---|---|---|
| | Corn starch | 5 min. | 10 min. | 20 min. |
| Endotherm temperature at peak onset, °C. | 62.0 | 64.2 | 68.0 | 71.1 |
| Endotherm temperature at peak, °C. | 68.0 | 76.6 | 77.2 | 78.5 |
| Endotherm temperature at peak conclusion, °C. | 77.0 | 81.9 | 82.0 | 86.3 |
| Heat of gelatinization, joule/g | 12.4 | 8.8 | 6.4 | 6.2 |

These results indicate that swelling of granules and endotherm were clearly observed even with the treated starches showing no 7%-amylogram viscosity.

EXAMPLE 3 M-HMT

A Nauta mixer to be used for vacuum drying (Model NXV; Hosokawa Micron Corporation), as shown in FIG. 2, was employed in this example as a heat-moisture treating apparatus. This contains a rotating and revoluting screw, the whole apparatus can be closed so as to perform vacuum-pressure-steam heating, and its exterior is jacketed to heat the content of the apparatus.

The rotating and revoluting screw pushes the content (material to be treated) to the jacket wall, thus increasing its temperature. The whole apparatus (internal volume: 100 liters) was preheated to about 80° C. or higher by introducing steam into the jacket. Then about 50 Kg of commercially available corn starch (moisture content: 13.0%) was charged in the apparatus, which was then enclosed. The agitation at a rotation rate of 93 rpm and a revolution rate of 3.65 rpm was immediately started. When the temperature of corn starch reached about 80° C., the vacuum line was opened to perform the pressure-reduction operation (the first step), and when the pressure was reduced to 70 Torr after six minutes, the vacuum line was closed and the pressure-steam line was opened to perform the heat-moisture treatment (the second step).

After the heat-moisture treatment at a predetermined temperature for a predetermined time, the pressure-steam line was closed, and the internal pressure was released. The vacuum line was then opened, and the heat-moisture treated starch was taken out when the temperature reached about 80° C.

The following Table 5 shows the time required for pressure reduction and the degree of vacuum (in the first step); and the heating temperature and time, the amount of steam introduced, and the 10%-amylogram viscosity when the temperature reached 95° C. (in the second step). It is apparent from these results that the object of this invention was satisfactorily achieved.

The vacuum line of this apparatus is equipped with a pulsaire collector of bag filter type and a condensor in order to prevent the content in the apparatus from being scattered outside during the pressure reduction.

According to this method, semicontinuous operations can be carried out by taking out the treated starch which is still hot and immediately charging the next lot of starch; a higher degree of efficiency is expected in its industrial application, and operations can be performed on a larger scale.

TABLE 5

M-HMT Treating Conditions and Physical Properties of Products

| Exp. No. | | 1 | 2 | 3 |
|---|---|---|---|---|
| Treating conditions: | | | | |
| First step | Pressure reduction time (min) | 6 | 6 | 6 |
| | Degree of vacuum (Torr) | 70 | 70 | 70 |
| Second step | Heating temp. (°C.) | 124 | 128 | 120 |
| | Heating time (min) | 25 | 20 | 30 |
| | Pressure (Kg/cm$^2$) | 2.3 | 2.6 | 2.8 |
| | Amt. of steam introduced (Kg) | 7.8 | 11.2 | 10.1 |
| Physical properties of products: | | | | |
| Moisture content (%) | | 8.3 | 8.8 | 11.2 |
| 10%-Amylogram viscosity at 95° C., BU | | 370 | 155 | 60 |
| Amylase digestibility at 40° C. (%) | | 30.1 | 29.4 | 51.7 |
| DSC | Endotherm temp. at peak onset (°C.) | 70.1 | 70.0 | 71.2 |
| Rate = 5° C./min | Endotherm temp. at peak (°C.) | 74.5 | 77.0 | 81.5 |
| | Endotherm temp. at peak conclusion (°C.) | 82.2 | 84.7 | 89.3 |

TABLE 5-continued

| M-HMT Treating Conditions and Physical Properties of Products | | | |
|---|---|---|---|
| Exp. No. | 1 | 2 | 3 |
| Heat of gelatinization, J/g | 7.95 | 7.53 | 2.93 |

EXAMPLE 4 S-HMT Treatment of corn flour

Commercial corn flour (200-70 mesh) was spread as a 5 cm thick layer and subjected to vacuum and heat-moisture treatment.

The apparatus used was of a type as shown in FIG. 1 having a cylindrical vessel of 40 cm diameter and 80 cm length, resistant to both internal and external pressures (Retort Sterilizer, manufactured by Hisaka Works, Ltd.). Corn flour was put on a stainless steel vat (25 cm×32 cm) to form a 5 cm thick layer. That with the corn flour layer thereon was place within the vessel. After closing the vessel the vacuum line was first opened, and when the pressure was reduced to 30 Torr after ten minutes, it was closed and the pressure-steam line (steam pressure 2.4 $Kg/cm^2G$) was opened to introduce pressure steam into the vessel. The moisture-heat treatment was conducted at 125° C. for 20 minutes and then the pressure was released, and the vessel interior was then made reduced pressure and cooled. Then the vessel was opened and the treated material was taken out and pulverized. The amylogram characteristics of the resulting product are shown in Table 6.

TABLE 6

| Moisture-heat treated corn flour Amylogram measurement (at 9.0% conc.) | | |
|---|---|---|
| | Untreated | Treated |
| Gelatinization temperature, °C. | 63.5 | 78.5 |
| Maximum viscosity (B.U.) | 410 | 210 |
| Temperature at max. viscosity, °C. | 89.5 | 95.0 |
| Viscosity after 30 min. at 95° C. (B.U.) | 295 | 425 |
| Viscosity on cooling to 50° C. (B.U.) | 840 | 705 |

Since the viscosity was low the viscosity measurement was conducted with 9% aqueous suspension. By the treatment of this invention the gelatinization temperature was increased by about 15° C. and the maximum viscosity was lowered.

EXAMPLE 5 S-HMT Treatment of rice flour

The procedure of Example 4 was repeated except that commercial rice flour (250-100 mesh) was treated instead of corn flour and that the moisture-heat treatment was conducted at 120° C. for 30 minutes, The amylogram characteristics of the resulting product are shown in Table 7.

TABLE 7

| Moisture-heat treated rice flour Amylogram measurement (at 9.0% conc.) | | |
|---|---|---|
| | Untreated | Treated |
| Gelatinization temperature °C. | 82.1 | 91.4 |
| Maximum viscosity (B.U.) | 680 | 175 |
| Temperature at max. | 92.6 | 95.0 |

TABLE 7-continued

| Moisture-heat treated rice flour Amylogram measurement (at 9.0% conc.) | | |
|---|---|---|
| | Untreated | Treated |
| viscosity, °C. | | |
| Viscosity after 30 min. at 95° C. (B.U.) | 420 | 320 |
| Viscosity on cooling to 50° C. (B.U.) | 800 | 600 |

Since the viscosity was low the viscosity measurement was conducted with 9% aqueous suspension. By the treatment of this invention the gelatinization temperature was increased by 9.3° C., while the maximum viscosity was lowered.

EXAMPLE 6 S-HMT Treatment of wheat flour

The procedure of Example 4 was repeated except that commercial low protein content wheat flour (VIOLET, product of Nisshin Seifun K.K.) was treated instead of corn flour and that the moisture-heat treatment was conducted at 125° C. for 30 minutes. The amylogram characteristics of the resulting product are shown in Table 8.

TABLE 8

| Moisture-heat treated wheat flour Amylogram measurement (at 8.7% conc.) | | |
|---|---|---|
| | Untreated | Treated |
| Gelatinization temperature °C. | 78.5 | 84.5 |
| Maximum viscosity (B.U.) | 120 | 40 |
| Temperature at max. viscosity, °C. | 95.0 | 95.0 |
| Viscosity after 30 min. at 95° C. (B.U.) | 140 | 80 |
| Viscosity on cooling to 50° C. (B.U.) | 300 | 150 |

Since the viscosity was low the viscosity measurement was conducted with 8.7% aqueous suspension. By the treatment of this invention the gelatinization temperature was increased by 6° C., while the maximum viscosity was lowered.

What we claim is:

1. A process for producing heat-moisture treated starch by treating starch in a pressure vessel resistant to both internal and external pressure and equipped with a vacuum line and pressure-steam line, the process comprising treating starch in said pressure vessel under reduced pressure of 200 Torr or less in a first step, and then introducing steam into said pressure vessel in a second step, thereby performing heat treatment on the starch, whereby the treating of the starch under reduced pressure tends to remove entrained air in spaces between particles of starch.

2. The process as defined in claim 1, wherein said pressure vessel is preheated before said starch is introduced therein.

3. The process as defined in claim 1 or 2, wherein said pressure vessel is held under a pressure reduced from atmospheric after the heat-moisture treatment to cool the treated starch.

* * * * *